Dec. 20, 1955     E. N. FOLTZ     2,728,032
COMBINED CURB FEELER AND STATIC GROUNDER
Filed Dec. 22, 1952
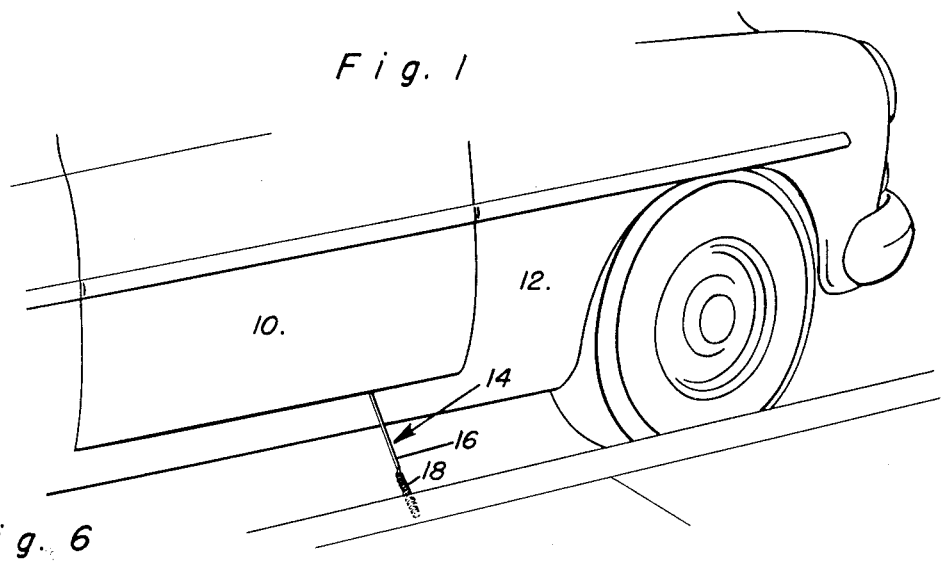
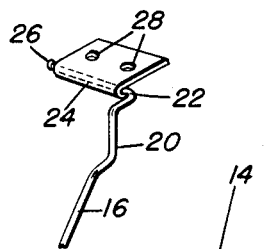
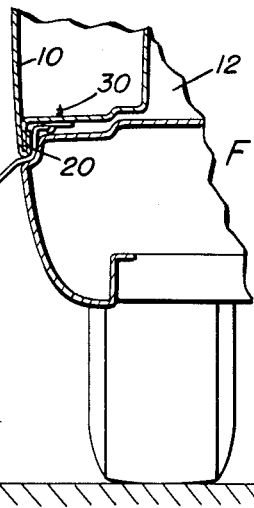
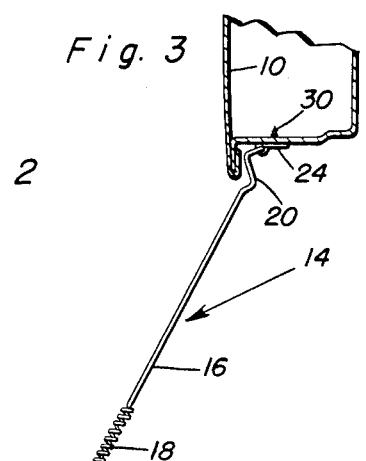
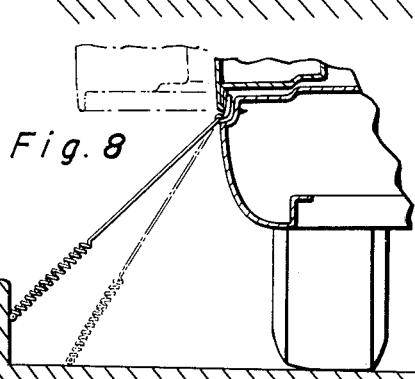
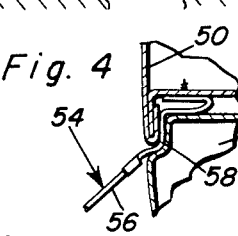
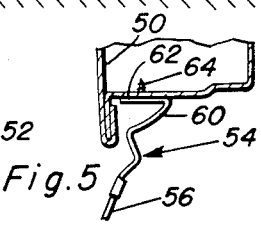
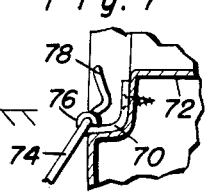
Ermald N. Foltz
INVENTOR.

United States Patent Office 2,728,032
Patented Dec. 20, 1955

2,728,032

COMBINED CURB FEELER AND STATIC GROUNDER

Ernald N. Foltz, Woodruff, Wis.

Application December 22, 1952, Serial No. 327,273

3 Claims. (Cl. 317—2)

This invention relates to an accessory for automotive vehicles and particularly to a combined curb feeler and static grounder.

Accumulations of static electricity by automotive vehicles is such that individuals touching the charged car may sometimes receive a definite and uncomfortable shock. The vehicles are supported on conventional pneumatic tires which have good electrical insulative qualities, therefore the accumulations of such static electricity can not be readily eliminated unless means are provided for grounding the automobile. Furthermore, in automobiles using seat covers or upholstery made from synthetic plastic materials, the usual accumulation of static electricity will be noticed many times over. This is because the rubbing of the driver's or occupant's clothing on the seat covers tends to additionally generate static electricity.

It is therefore the primary object of this invention to provide means for readily discharging the static electricity from an automobile when the door thereof is opened to permit the occupants to alight or to enter thereinto, which static grounding means also functions as a curb feeler when the automobile is in motion and being parked.

Still further objects of this invention reside in the provision of a combined curb feeler and static grounder that is strong, durable, capable of being easily attached to the doors of any conventional automobile regardless of the make or model, and which is relatively inexpensive to manufacture while being unobtrusive in appearance.

These, together with the various ancillary objects of the invention which will become apparent as the following description proceeds, are attained by this combined curb feeler and static grounder, preferred embodiments of which have been illustrated in the accompanying drawings, by way of example only, wherein:

Figure 1 is a perspective view showing the invention as installed in operative use on an automobile;

Figure 2 is a vertical sectional view of the automobile showing the manner in which a first form of the invention is used as a curb feeler;

Figure 3 is a vertical sectional view of the structure shown in Figure 2 with the door open and with the invention in its static grounding position;

Figure 4 is a vertical sectional detail showing a modified form of securing the invention to the door of an automobile, with the automobile in a closed position;

Figure 5 is a vertical sectional view similar to that of Figure 4 with the door in an open position;

Figure 6 is a perspective detail showing the construction of the means for securing the invention to the door of an automotive vehicle, the construction being similar to that as is shown in Figures 2 and 3;

Figure 7 is a vertical sectional view illustrating an alternative association of the curb feeler with the automobile; and, Figure 8 is another view of the construction shown in Figure 7 with the door closed.

With continuing reference to the accompanying drawings wherein like reference numerals designate similar parts throughout the various views, and with particular reference to Figures 1 through 3 and 6, reference numeral 10 is used to generally designate the door of an automotive vehicle indicated at 12 on which the combination curb feeler and static grounder comprising the present invention and generally indicated at 14 is adapted to be secured.

The combination curb feeler and static grounder 14 is constructed from an elongated rod 16 having a helical feeler portion 18 at one end thereof, the feeler portion being of conventional design and being adapted to provide the rasping vibratory signal as is produced by conventional curb feelers now available to the public. The other end of the rod 16 is twisted and bent in a substantially S shape as at 20 to conform to the contours of the inner bottom edge of the door 10. The rod 16 terminates in an end 22 which extends at right angles to the other portions of the rod. The end 22 of the rod 16 is engaged within a suitable aperture in a hinge member 24. A head 26 may be provided for the rod 16 so as to prevent the end 22 from being disengaged from the hinge member 24. Suitable apertures 28 are formed in the hinge member 24 to enable sheet metal screws 30 or any other convenient fastener to secure a hinge member 24 to the door 10.

In operation, with the door closed, the door 10 will abut against the S-shaped portion 20 and hold the curb feeler in the uppermost position as is shown in Figure 2 where the device may readily perform its function as a curb feeler. However, when the door is open, the end portion 22 will readily rotate within the hinge member 24 and the static grounder will be rotated so as to enable it to engage the ground and discharge any accumulation of static electricity.

Referring now to the embodiment of the invention as is shown in Figures 4 and 5, it will be seen that herein the door 50 is provided for the automobile 52 and the combination curb feeler and static eliminator is generally indicated at 54. The curb feeler and static grounder 54 includes a rod 56 which is twisted to conform to the configuration as at 58 of the door 50. The portion 58 is formed from a suitable resilient spring portion 60 which has a plate portion 62 secured by suitable sheet metal screws 64 or like fasteners to the door 50. Thus, when the door is closed, the body 52 coacting with the door 50 will cause the rod 56 to be rotated upwardly. However, when the door is opened the spring portion 60 will urge the rod 56 downwardly. Obviously, the feeler portion (not shown) at the free end of the rod 56 will either engage the curb when the door is closed or the ground when the door is opened.

With reference to Figure 7, the hinge plate 70 is attached to the body of the automobile 72 and the combination curb feeler and static eliminator 74 is pivotally supported as at 76. Thus, when the door is closed, the door will engage the upper contact extension 78 of the curb feeler 74 to raise the lowermost end of the curb feeler.

Since from the foregoing the construction and advantages of this combined curb feeler and static eliminator are readily apparent, further description is believed to be unnecessary.

However, since numerous modifications will readily occur to those skilled in the art after a consideration of the foregoing specification and accompanying drawings, it is not intended to limit the invention to the precise embodiment shown and described but all suitable modifications and equivalents may be readily resorted to which fall within the scope of the appended claims.

What is claimed as new is as follows:

1. A combined curb feeler and static grounder comprising an elongated rod having a resilient feeler portion at one end thereof, means at the other end of said rod for securing said rod to said automobile, and means cooperating with the door of an automobile permitting said feeler to engage the ground when said door is opened but engaging said door and rotating said feeler upwardly when said door is closed.

2. A combined curb feeler and static grounder comprising an elongated rod having a resilient feeler portion at one end thereof, means at the other end of said rod for securing said rod to said automobile, and means cooperating with the door of an automobile permitting said feeler to engage the ground when said door is opened but engaging said door and rotating said feeler upwardly when said door is closed, said last recited means comprising a rod portion configurated to conform to the shape of the bottom edge of the door, a hinge plate adapted to be secured to the door, said rod being rotatably carried by said hinge plate.

3. A combined curb feeler and static grounder comprising an elongated rod having a resilient feeler portion at one end thereof, means at the other end of said rod for securing said rod to said automobile, and means cooperating with the door of an automobile permitting said feeler to engage the ground when said door is opened but engaging said door and rotating said feeler upwardly when said door is closed, said last recited means including a rod portion configurated to conform to the shape of the bottom edge of the door, a resilient spring portion at said other end of said rod, and a fastener securing said resilient spring portion to said body.

References Cited in the file of this patent

UNITED STATES PATENTS

| | | |
|---|---|---|
| 1,709,779 | Crothers | Apr. 16, 1929 |
| 2,259,614 | Chang | Oct. 21, 1941 |

FOREIGN PATENTS

| | | |
|---|---|---|
| 494,424 | Great Britain | Oct. 26, 1938 |